US011128196B2

(12) United States Patent
Zhu et al.

(10) Patent No.: US 11,128,196 B2
(45) Date of Patent: Sep. 21, 2021

(54) AXIAL SPLIT-PHASE BEARINGLESS FLYWHEEL MOTOR OF THREE PHASES AND FOUR DEGREES OF FREEDOM

(71) Applicant: Nanjing Institute Of Technology, Jiangsu (CN)

(72) Inventors: Zhiying Zhu, Jiangsu (CN); Yukun Sun, Jiangsu (CN); Sipeng Hao, Jiangsu (CN); Ming Chen, Jiangsu (CN); Jin Zhu, Jiangsu (CN); Hailang Zhu, Jiangsu (CN)

(73) Assignee: Nanjing Institute Of Technology, Jiangsu (CN)

( * ) Notice: Subject to any disclaimer, the term of this patent is extended or adjusted under 35 U.S.C. 154(b) by 104 days.

(21) Appl. No.: 16/626,568

(22) PCT Filed: Dec. 24, 2018

(86) PCT No.: PCT/CN2018/122981
§ 371 (c)(1),
(2) Date: Dec. 26, 2019

(87) PCT Pub. No.: WO2019/205683
PCT Pub. Date: Oct. 31, 2019

(65) Prior Publication Data
US 2020/0119615 A1    Apr. 16, 2020

(30) Foreign Application Priority Data
Apr. 27, 2018    (CN) .......................... 201810394264.8

(51) Int. Cl.
*H02K 7/09*    (2006.01)
*H02K 7/02*    (2006.01)
(Continued)

(52) U.S. Cl.
CPC ............... *H02K 7/025* (2013.01); *H02K 1/18* (2013.01); *H02K 1/223* (2013.01); *H02K 1/2726* (2013.01);
(Continued)

(58) Field of Classification Search
CPC ............. H02K 7/09; H02K 7/02; H02K 7/083
See application file for complete search history.

(56) References Cited

U.S. PATENT DOCUMENTS 5,302,874 A * 4/1994 Pinkerton ............. F16C 32/044
                                                      310/90.5
6,034,456 A * 3/2000 Osama ................ F16C 32/0497
                                                      310/112
(Continued)

FOREIGN PATENT DOCUMENTS

| CN | 106385203 | 2/2017 |
|---|---|---|
| CN | 106936338 | 7/2017 |
| CN | 108539914 | 9/2018 |

OTHER PUBLICATIONS

"International Search Report (Form PCT/ISA/210) of PCT/CN2018/122981", dated Mar. 6, 2019, with English translation thereof, pp. 1-4.

*Primary Examiner* — Dang D Le
(74) *Attorney, Agent, or Firm* — JCIP Global Inc.

(57) ABSTRACT

An axial split-phase bearingless flywheel motor includes a stator, a stator sleeve, a rotor, a rotor sleeve, and a flywheel. The stator and the rotor are axially divided into phases A, B and C. An axially magnetized permanent magnet is provided between every adjacent phases. Twelve rotor poles are provided at equal intervals on an inner side of the rotor core in each of the phases A, B, and C. The rotor poles in the phases A, B and C are staggered in sequence along a circumference by ⅓ of a rotor pole pitch. Eight torque poles in a shape of narrow teeth and four suspension poles in a (Continued)

shape of wide teeth are provided on the stator core in both the phases A and C, and twelve torque poles of a uniform width are provided on the stator core in the phase B.

6 Claims, 4 Drawing Sheets

(51) Int. Cl.
*H02K 1/18* (2006.01)
*H02K 1/22* (2006.01)
*H02K 1/27* (2006.01)
*H02K 1/30* (2006.01)
*H02K 3/28* (2006.01)
*H02K 3/47* (2006.01)

(52) U.S. Cl.
CPC ............... *H02K 1/30* (2013.01); *H02K 3/28* (2013.01); *H02K 3/47* (2013.01)

(56) References Cited

U.S. PATENT DOCUMENTS

| | | | |
|---|---|---|---|
| 6,166,469 A | 12/2000 | Osama et al. | |
| 6,727,616 B1 * | 4/2004 | Gabrys | F16C 32/0427 310/90.5 |
| 7,023,117 B2 * | 4/2006 | Fremerey | F16C 32/0408 310/90.5 |
| 7,663,281 B1 * | 2/2010 | Nau | B61B 13/08 310/90.5 |
| 2006/0238053 A1 | 10/2006 | Kascak et al. | |

* cited by examiner

AXIAL SPLIT-PHASE BEARINGLESS FLYWHEEL MOTOR OF THREE PHASES AND FOUR DEGREES OF FREEDOM

CROSS-REFERENCE TO RELATED APPLICATION

This application is a 371 of international application of PCT application Ser. No. PCT/CN2018/122,981, filed on Dec. 24, 2018, which claims the priority benefit of China application no. 201810394264.8, filed on Apr. 27, 2018. The entirety of each of the above mentioned patent applications is hereby incorporated by reference herein and made a part of this specification.

BACKGROUND

Technical Field

The present invention relates to the field of bearingless motors, and in particular, to an axial split-phase bearingless flywheel motor of three phases and four degrees of freedom.

Description of Related Art

With the development of fields such as new energy generation, distributed power systems, hybrid vehicles, and aerospace, energy storage technologies have become a global hot research topic. Among various energy storage technologies, flywheel energy storage (FES) is highly valued both at home and abroad due to such advantages as high efficiency, great power, long service life, high energy storage density, and no pollution. However, the FES technology still has many technical problems, including implementation of a suspension support system. In order to reduce the loss in suspension support, an FES system generally uses a plurality of magnetic bearings, which inevitably prolongs a flywheel rotor in an axial direction. As a result, the critical speed of rotation is reduced, and the structure of a flywheel battery is complicated.

Bearingless motors integrate a suspension support system and a drive motor. When used as a core element in the FES system, the bearingless motor can greatly shorten the flywheel rotor in an axial direction, facilitating implementation of high-speed/ultra-high-speed operation, and improving the specific energy and specific power of the system. Switched reluctance motors have such advantages as a wide range of speed regulation, wide efficiency platform, simple and reliable structure, and high mechanical strength. Therefore, the switched reluctance motors are applicable to flywheels operating at high speed and ultra-high speed. By combining the switched reluctance motor technology and the bearingless motor technology, a bearingless switched reluctance motor (BSRM) is generated. The BSRM further eliminates a friction loss brought by mechanical bearings, and has advantages of no wear, a small size, low power consumption, and high axial utilization. Further, it can effectively reduce vibration amplitude and system noise, thus improving system operation reliability and prolonging the service life. Therefore, the BSRM particularly stands out in terms of potential application in the FES field.

However, at present, the BSRMs are not widely popularized in FES-related practical engineering applications both at home and abroad. The main reason is that strong and complicated electromagnetic coupling exists between windings, magnetic circuits, and the electromagnetic force inside the motor, increasing the difficulty in analysis and high-speed control for the motor, which immensely restricts the entry of the BSRMs into engineering applications. In recent years, some scholars try to weaken electromagnetic coupling from the perspective of the motor structure. They put forward various structures such as a dual-stator structure, hybrid-rotor structure, hybrid-stator structure, and permanent magnet biased structure. These new structures overcome the problem of electromagnetic coupling to a certain extent, but still have many shortcomings. For example, the dual-stator structure increases the difficulty in integration of the motor and the flywheel; the hybrid-rotor structure still has a long axial length, limiting the critical speed of rotation of the flywheel; and in the hybrid-stator structure and the permanent magnet biased structure, the suspension poles occupy much space, and the motor outputs limited torque and power, adversely affecting flywheel operation under conditions of fast charging and discharging. Therefore, China patent application No. 201610864124.3 provides an axial split-phase bearingless switched reluctance flywheel motor with an inner-stator and permanent magnet biased structure. This motor resorts to an axial split-phase design to realize suspension support at four degrees of freedom, and uses a permanent magnet to produce a biased magnetic flux, reducing the loss in suspension support and improving system efficiency and power density. However, the improved structure proposed by this invention is a two-phase structure, which does not have a self-starting property and outputs low-density and high-ripple torque, thus affecting the operation of the flywheel during charging and discharging.

SUMMARY

To solve the foregoing problems, the present invention provides an axial split-phase bearingless flywheel motor of three phases and four degrees of freedom, to further enhance a torque output, reduce torque ripple, and realize self-starting.

To achieve the foregoing objectives, the present invention is implemented through the following technical solutions. The present invention provides an axial split-phase bearingless flywheel motor of three phases and four degrees of freedom, which includes a stator, a stator sleeve, a rotor, a rotor sleeve, and a flywheel, where a rotor core, the rotor sleeve, and the flywheel are concentrically nested as a whole from inside to outside, and a stator core and the stator sleeve are concentrically nested on a stationary shaft. The stator and the rotor are axially divided into three sections, a phase A, a phase B and a phase C. An axially magnetized permanent magnet is provided between every adjacent phases. Twelve rotor poles are provided at equal intervals on an inner side of the rotor core in each of the phase A, the phase B, and the phase C. The rotor poles in the phase A, the rotor poles in the phase B, and the rotor poles in the phase C are staggered in sequence along a circumference by ⅓ of a rotor pole pitch, so as to realize self-starting by setting of turn-on and turn-off angles. Eight torque poles in a shape of narrow teeth and four suspension poles in a shape of wide teeth are provided on the stator core in both of the phase A and the phase C, and twelve torque poles of a uniform width are provided on the stator core in the phase B. A control coil is wound around each of the torque poles and each of the suspension poles, the control coils on the torque poles in the phase A are connected in series to form a phase-A torque winding, and the control coils on the torque poles in the phase C are connected in series to form a phase-C torque winding. The control coils on two opposite suspension poles in the phase A and the phase C are connected in series to form two sets of suspension windings in orthogonal directions. The control coils on the twelve torque poles in the phase B are connected in series to form a phase-B torque winding.

As a further improvement to the present invention, the torque poles and the suspension poles are designed into a shape of pole shoe teeth, a pole shoe width of each suspension pole is equal to the rotor pole pitch, and a pole shoe width of each torque pole is equal to ½ of the rotor pole pitch.

As a further improvement to the present invention, a magnetic isolation component is provided between the torque poles and the suspension poles.

As a further improvement to the present invention, a magnetic isolation ring is provided between the phase-B torque poles and the stator sleeve.

As a further improvement to the present invention, a first permanent magnet is provided between the phase A and the phase B, and a second permanent magnet is provided between the phase B and the phase C. A permanent magnetic circuit flows in a direction from an N pole of the first permanent magnet, through the stator sleeve in the phase A, the stator core in the phase A, an air gap in the phase A, the rotor core in the phase A, the rotor sleeve, the rotor core in the phase C, an air gap in the phase A, the stator core in the phase C, the stator sleeve in the phase C, an S pole of the second permanent magnet, the an N pole of the second permanent magnet, and the stator sleeve in the phase B, to an S pole of the first permanent magnet.

The present invention achieves the following advantageous effects. (1) The present invention adopts an axial split-phase structure, which has three phases: A, B and C. The rotor poles in different phases are staggered in sequence along a circumference by ⅓ of a rotor pole pitch, so as to realize self-starting by setting of turn-on and turn-off angles. (2) In the present invention, the stator in the phase A and the stator in the phase C are both provided with suspension poles and torque poles. In this way, the present invention enables the flywheel rotor to suspend and operate at four radial degrees of freedom while achieving energy conversion. (3) In the present invention, the twelve stator poles on the stator core in the phase B are all torque poles, effectively enhancing a torque output and power density of the motor and greatly reducing torque ripple. (4) In the present invention, a magnetic isolation ring is provided between the phase-B torque poles and the stator sleeve, such that a suspension control magnetic circuit of four radial degrees of freedom and a torque control magnetic circuit of three phases can be naturally decoupled, thus immensely reducing the difficulty in suspension control and torque control.

In the present invention, the stator and the rotor are axially divided into three sections: a phase A, a phase B and a phase C. The phase A and the phase C are both provided with suspension poles and torque poles, and the stator core in the phase B is provided with twelve torque poles of a uniform width at equal intervals. In this way, the present invention realizes self-starting and suspension at four degrees of freedom, reduces the torque ripple, and enhances the torque output.

DESCRIPTION OF THE EMBODIMENTS

To further understand the present invention, the present invention will be further described in detail below with reference to the accompanying drawings and specific embodiments. The embodiments are merely used for explaining the present invention, and do not constitute improper limitations to the scope of protection of the present invention.

Figure 1:
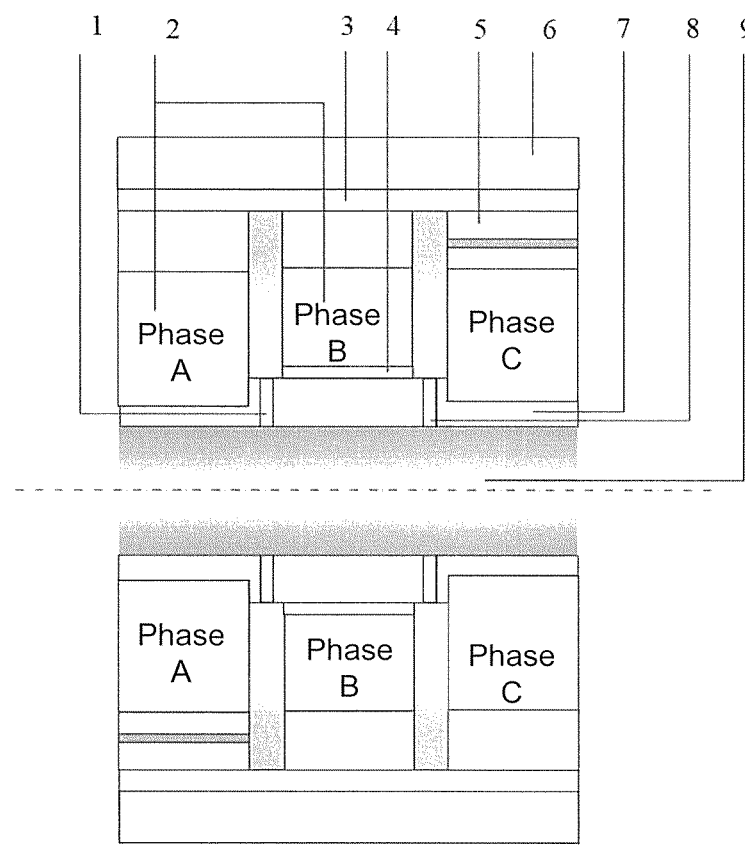
FIG. 1 is a schematic axial sectional diagram of a motor structure in the present invention.
Figure 2:
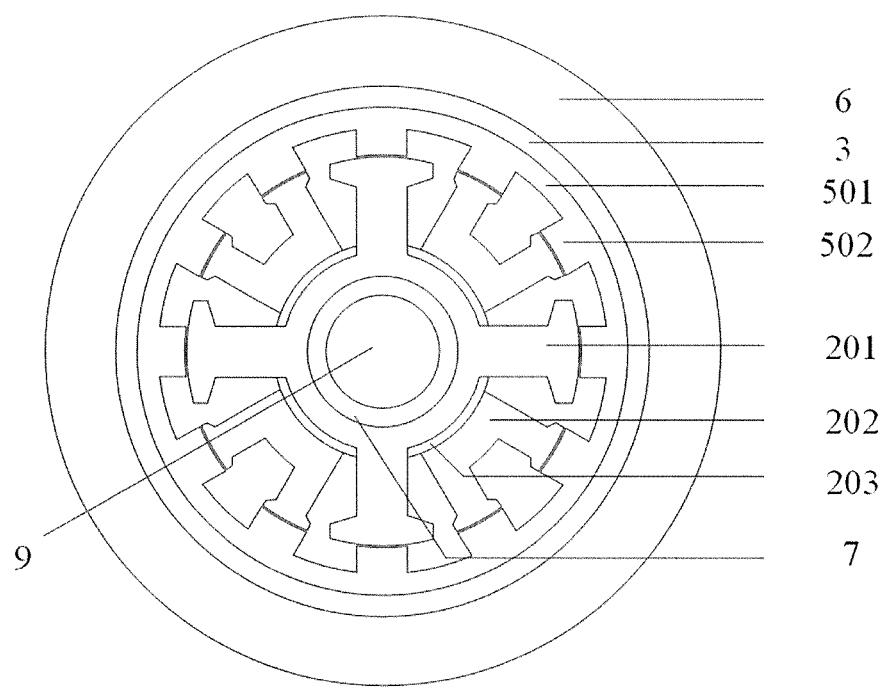
FIG. 2 is a schematic radial sectional diagram of the motor structure in a phase A in the present invention.
Figure 3:
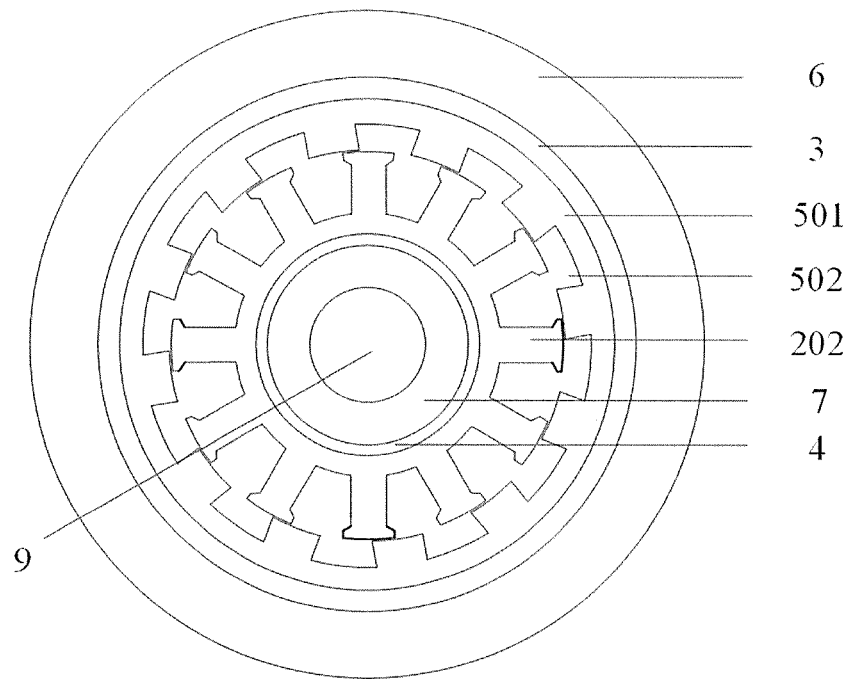
FIG. 3 is a schematic radial sectional diagram of the motor structure in a phase B in the present invention.
Figure 4:
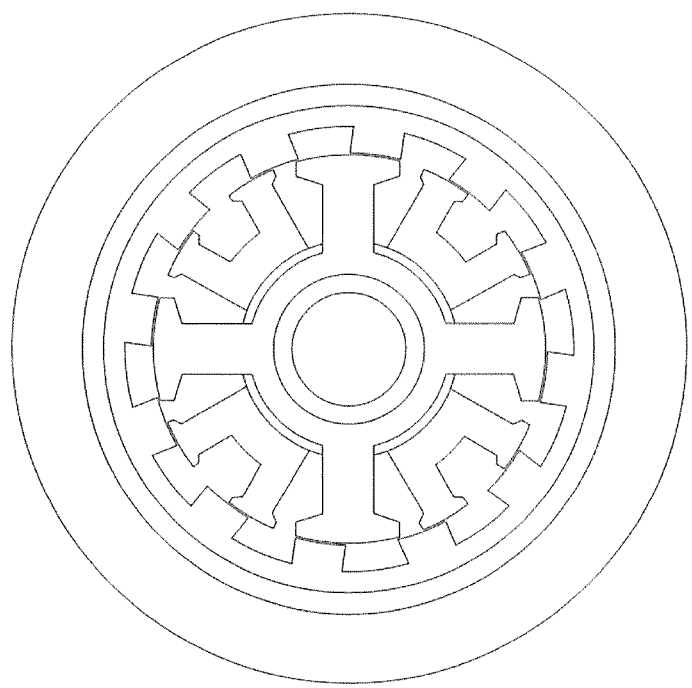
FIG. 4 is a schematic radial sectional diagram of the motor structure in a phase C in the present invention.
Figure 5:
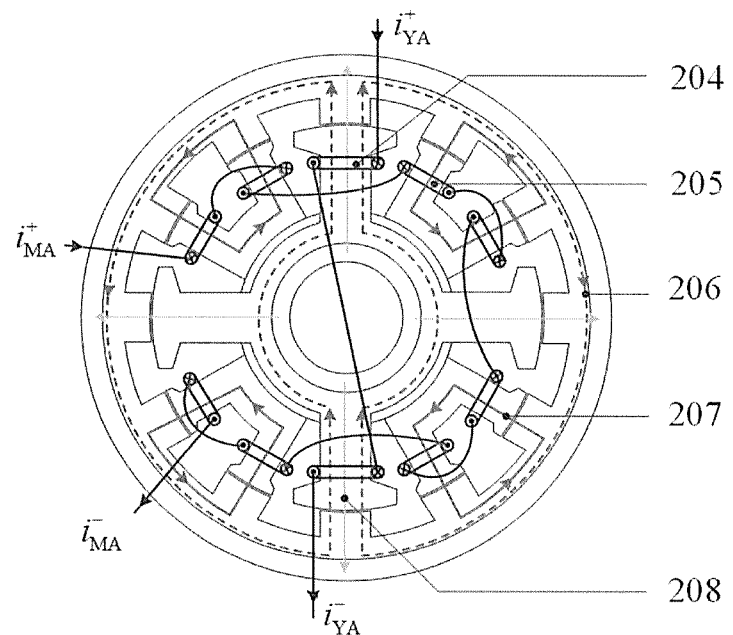
FIG. 5 is a schematic diagram showing connection of windings in the phase A in the present invention.
Figure 6:
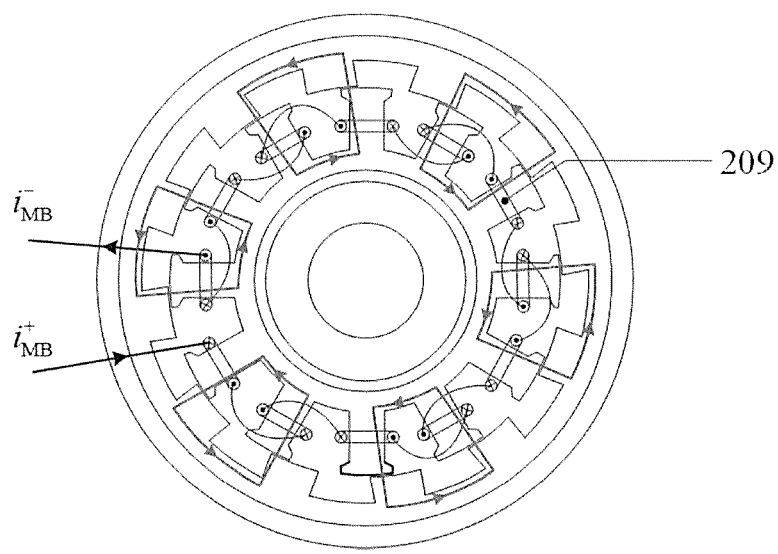
FIG. 6 is a schematic diagram showing connection of windings in the phase B in the present invention.
Figure 7:
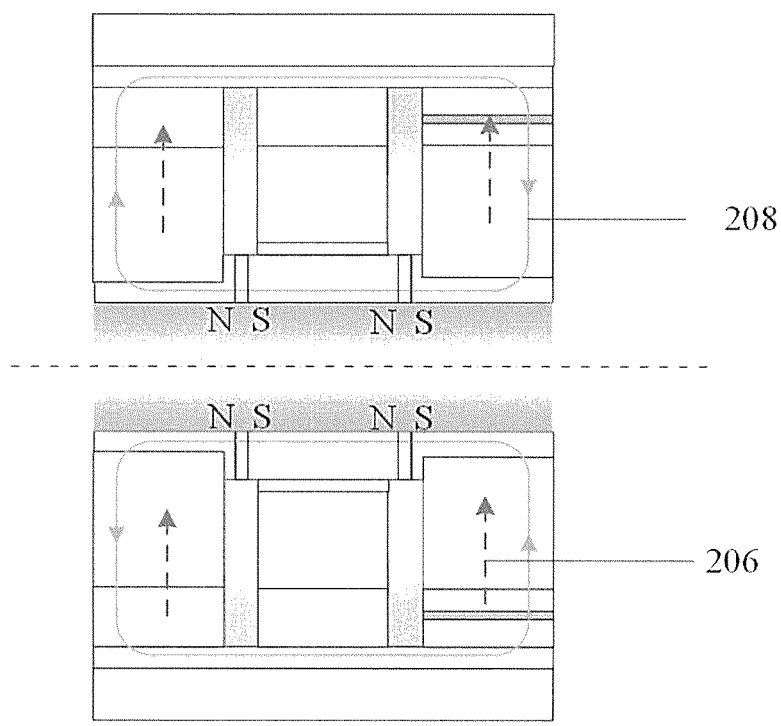
FIG. 7 is a schematic diagram of a permanent magnetic circuit and a magnetic circuit for control of a suspension winding of the motor in the present invention.

As shown in FIGS. 1 to 7, the present invention provides an axial split-phase bearingless flywheel motor of three phases and four degrees of freedom, which includes a stator 2, a stator sleeve 7, a rotor 5, a rotor sleeve 3, and a flywheel 6. The rotor core, the rotor sleeve 3, and the flywheel 6 are concentrically nested as a whole from inside to outside, and a stator core and the stator sleeve 7 are concentrically nested on a stationary shaft 9. The stator 2 and the rotor 5 are axially divided into three sections: a phase A, a phase B, and a phase C. An axially magnetized permanent magnet is provided between every adjacent phases. Twelve rotor poles 502 are provided at equal intervals on an inner side of the rotor core in each of the phase A, phase B and phase C. The rotor poles 502 in the phase A, the rotor poles 502 in the phase B, and the rotor poles 502 in the phase C are staggered in sequence along a circumference by ⅓ of a rotor pole pitch 501, so as to realize self-starting by setting of turn-on and turn-off angles. Eight torque poles 202 in a shape of narrow teeth and four suspension poles 201 in a shape of wide teeth are provided on the stator core in both the phase A and the phase C, and two torque poles 202 are provided between every two suspension poles 201 at equal intervals, and there are eight torque poles 202 in total. A permanent magnet ring, which is axially magnetized, is provided between the inner-stator cores in each phase, to produce a biased magnetic flux for the eight suspension poles in the phase A and the phase C. Twelve torque poles 202 of a uniform width are provided on the stator core in the phase B. Twelve rotor poles are provided at equal intervals on the inner side of the rotor core in each phase, and all rotor poles are staggered in sequence along the circumference by ⅓ of the rotor pole pitch, thus realizing self-starting. As the torque poles are increased in number in the phase B, a torque output is effectively enhanced and torque ripple is reduced. A magnetic isolation ring 4 is provided between the torque poles 202 in the phase B and the stator sleeve 7, such that a suspension control magnetic circuit and a torque control magnetic circuit can be naturally decoupled, thereby effectively improving the suspension property and a decoupling effect. A control coil is wound around each torque pole 202 and each suspension pole 201. A torque control coil is wound around the torque pole 202 and a suspension control coil is wound around the suspension pole 201. The control coils on the torque poles in the phase A are connected in series to form a phase-A torque winding 205, and the control coils on the torque poles in the phase C are connected in series to form a phase-C torque winding. The control coils on two opposite suspension poles 201 in the phase A and the phase C are connected in series, to form two sets of suspension windings in orthogonal directions. That is to say, there are two sets of suspension windings 204 in the phase A in orthogonal directions, and each set is formed by reversely connecting in series the control coils on two opposite suspension poles in the respective direction. There are two sets of suspension windings 204 in the phase C in orthogonal directions, and each set is formed by reversely connecting in series the control coils on two opposite suspension poles in the respective direction. The control coils on the twelve torque poles 202 in the phase B are connected in series to form a phase-B torque winding 209, which can effectively enhance the torque output of the motor. The torque poles 202 and the suspension poles 201 are designed into a shape of pole shoe teeth, and a pole shoe width of each suspension pole 201 is equal to the rotor pole pitch 501. At any position of the rotor, the aligned areas of the suspension poles and the rotor poles are constant. A pole shoe width of each torque pole 202 is equal to ½ of the rotor pole pitch 501. A magnetic isolation component 203 is provided between the torque poles 202 and the suspension poles 201. A first permanent magnet 1 is provided between the phase A and the phase B, and a second permanent magnet 8 is provided between the phase B and the phase C. A permanent magnetic circuit 208 flows in a direction from an N pole of the first permanent magnet 1, through the stator sleeve in the phase A, the stator core in the phase A, an air gap in the phase A, the phase-A rotor core, the rotor sleeve, the rotor core in the phase C, an air gap in the phase C, the stator core in the phase C, the stator sleeve in the phase C, an S pole of the second permanent magnet 8, an N pole of the second permanent magnet 8, and the stator sleeve in the phase B to an S pole of the first permanent magnet 1.

In the present invention, rotor poles in different phases are staggered in sequence along the circumference by ⅓ of a rotor pole pitch, so as to realize self-starting by setting of turn-on and turn-off angles. Twelve torque poles are provided on the stator core in the phase B, which can effectively enhance a torque output and greatly reduce torque ripple, thus making it more convenient to control the motor during charging and discharging. A magnetic isolation ring is provided between the torque poles in the phase B and an axial sleeve, such that a suspension control magnetic circuit and a torque control magnetic circuit can be naturally decoupled, thus effectively improving the suspension property and a decoupling effect.

What is claimed is:

1. An axial split-phase bearingless flywheel motor of three phases and four degrees of freedom, comprising a stator, a stator sleeve, a rotor, a rotor sleeve, and a flywheel, wherein a rotor core, the rotor sleeve, and the flywheel are concentrically nested as a whole from inside to outside, and a stator core and the stator sleeve are concentrically nested on a stationary shaft; the stator and the rotor are axially divided into three sections, which are a phase A, a phase B, and a phase C, and an axially magnetized permanent magnet is provided between every adjacent phases; twelve rotor poles are provided at equal intervals on an inner side of the rotor core in each of the phase A, the phase B and the phase C; the rotor poles in the phase A, the rotor poles in the phase B, and the rotor poles in the phase C are staggered in sequence along a circumference by ⅓ of a rotor pole pitch, so as to realize self-starting by setting of turn-on and turn-off angles; eight torque poles in a shape of narrow teeth and four suspension poles in a shape of wide teeth are provided on the stator core in both of the phase A and the phase C, and twelve torque poles of a uniform width are provided on the stator core in the phase B; a control coil is wound around each of the torque poles and each of the suspension poles, the control coils on the torque poles in the phase A are connected in series to form a phase-A torque winding, and the control coils on the torque poles in the phase C are connected in series to form a phase-C torque winding; the control coils on two opposite suspension poles in the phase A and the phase C are connected in series to form two sets of suspension windings in orthogonal directions; and the control coils on the twelve torque poles in the phase B are connected in series to form a phase-B torque winding.

2. The axial split-phase bearingless flywheel motor of three phases and four degrees of freedom according to claim 1, wherein the torque poles and the suspension poles are designed into a shape of pole shoe teeth, a pole shoe width of each of the suspension poles is equal to the rotor pole pitch, and a pole shoe width of each of the torque poles is equal to ½ of the rotor pole pitch.

3. The axial split-phase bearingless flywheel motor of three phases and four degrees of freedom according to claim 1, wherein a magnetic isolation component is provided between the torque poles and the suspension poles.

4. The axial split-phase bearingless flywheel motor of three phases and four degrees of freedom according to claim 1, wherein a magnetic isolation ring is provided between the phase-B torque poles and the stator sleeve.

5. The axial split-phase bearingless flywheel motor of three phases and four degrees of freedom according to claim 1, wherein a first permanent magnet is provided between the phase A and the phase B, and a second permanent magnet is provided between the phase B and the phase C; and a permanent magnetic circuit flows in a direction from an N pole of the first permanent magnet, through the stator sleeve in the phase A, the stator core in the phase A, an air gap in the phase A, the rotor core in the phase A, the rotor sleeve, the rotor core in the phase C, an air gap in the phase C, the stator core in the phase C, the stator sleeve in the phase C, an S pole of the second permanent magnet, an N pole of the second permanent magnet, and the stator sleeve in the phase B, to an S pole of the first permanent magnet.

6. The axial split-phase bearingless flywheel motor of three phases and four degrees of freedom according to claim 2, wherein a magnetic isolation component is provided between the torque poles and the suspension poles.

* * * * *